United States Patent [19]

Schumacher et al.

[11] Patent Number: 5,060,165
[45] Date of Patent: Oct. 22, 1991

[54] OPTIMIZING MAIL PROCESSING BY MATCHING PUBLISHER AND PRINTER ENTITIES

[75] Inventors: Karl H. Schumacher, Westport, Conn.; Raymond Keating, Purdys, N.Y.

[73] Assignee: Pitney Bowes Inc., Stamford, Conn.

[21] Appl. No.: 416,732

[22] Filed: Oct. 3, 1989

[51] Int. Cl.⁵ .............................................. G06F 15/21
[52] U.S. Cl. ..................................... 364/478; 364/401
[58] Field of Search ............. 364/478, 464.02, 464.03, 364/466, 401, 402, 200 MS File, 900 MS File; 235/375, 432; 270/54-58; 53/266 A, 504, 584; 209/900

[56] References Cited

U.S. PATENT DOCUMENTS

4,583,195 4/1986 Daniels et al. ................... 364/900
4,639,873 1/1987 Baggarly et al. ................ 270/58 X
4,800,506 1/1989 Axelrod et al. .................... 364/478

Primary Examiner—Joseph Ruggiero

[57] ABSTRACT

A system and method is described for optimizing mail processing by applying a co-mail concept. A network is established involving a data center and plural publishers and printers of advertising documents. Databases are established at the data center of profiles of the publishers and printers and their current and prospective activities, and the information used by the data center to match publisher to printer for particular jobs to reduce mail processing and distribution costs, or expedite mail distribution.

15 Claims, 6 Drawing Sheets

OPTIMIZING MAIL PROCESSING BY MATCHING PUBLISHER AND PRINTER ENTITIES

This invention relates to article processing and delivery, and specifically to improvements in mail processing systems to reduce costs and which will relieve official postal facilities of certain mail handling tasks.

BACKGROUND OF THE INVENTION

As discussed in commonly-assigned U.S. patent application Ser. No. 285,891, filed Dec. 16, 1988, U.S. Pat. No. 5,008,827, the contents of which are herein incorporated by reference, the United States currently has the world's largest postal system. The U.S. Post Offices currently handle in excess of 100 billion pieces of mail per year, about half the total volume handled throughout the world. The servicing of mail delivery involves three essential steps; collection, sorting and delivery. Collection takes place through a series of Post Offices spread throughout the United States. The United States has about 30,000 Post Offices that provide mail services in addition to 9,000 smaller postal centers which provide some type of mail service. Postal employees typically take letters and packages from mail box facilities to the nearest local office where it is accumulated for the sorting procedure. At the Post Office, postal clerks remove collected mail from sacks, bundle packages and segregate mail by size and class into separate categories. The mail travels by truck from local post offices to a central facility known as a sectional center. The United States has 264 sectional centers, some of which serve hundreds of local Post Offices. The sectional center processes nearly all the mail coming or going from its region. At the sectional center, high speed automated equipment sorts large volumes of mail. A computerized machine known as a zip mail translator sorts the postmarked letters according to their destination post office. Postal workers selectively activate the machine's keyboard to send each letter on a conveyor belt into one of many bins. Each bin holds mail for a different Post Office or postal region. Mail addressed to locations outside the regions served by the sectional center are transported by truck, airplane or train by various carriers via various routes to other sectional centers for further sorting. Finally, postal clerks hand sort mail for the area served by the local office into bundles for each delivery route.

Current estimates indicate that the foregoing processing tasks necessarily involve in excess of half a million employees. Cost of maintaining and supporting sorting services at the central post office facilities, even including large scale use of automated equipment, has become staggering. Projections of substantial increases in volumes of mail being transported through central facilities, even with the advent of private delivery, telecommunications services, facsimile services and the like indicate a rapid expansion will be required of such facilities. Since the Postal Service is a private corporation and is expected to become self-supporting, rapidly advancing postal rates place greater and greater burdens on both users and the Postal Service in order to support such volumes of mail. In recognition of capabilities of certain high volume users to provide services to central postal facilities, which services may improve efficiency and reduce the amount of processing time required by the central serving facilities, the U.S. Postal Service offers substantial reductions in rates or discounts, provided that a user comply with certain requirements which will allow the U.S. Postal Service to take advantage of certain user-provided facilities to reduce its own work load. The concept of work sharing, wherein a user provides certain of the processing activities prior to delivering the mail to the postal system, has been proposed in the copending application and is therefore a positive innovation in the field of mail processing which may have a substantial impact in the future implementation of mail services.

Under present systems in use, entities involved in creating batch mailings unwittingly contribute to the increasing workload of the Postal System. In mass mailings especially of advertisements (ads), it is common to print the hardcopy ads at a printer local to the ad publisher, and package ad mail at one or a few professional mailer entities. If, for example, the ads are destined for distribution over a wide geographical area, but the mailings are generated at one or only a few locations, it means that the Postal Service assumes the major burden of processing and delivery to the addressees.

Another factor contributing to inefficient distribution is envelope capacity. Frequently, ads are generated at several different locations, separately enveloped or packaged (meaning machine stuffed in mailing envelopes or packages), addressed, and then dropped off at a local Post Office. Often these separately enveloped ads are intended for the same addressees. So, the Postal Service ends up delivering separate mailings to the same addressee, resulting in multiple processing of documents delivered over the exact same route.

DESCRIPTION OF RELATED APPLICATIONS

Systems relating to work share features are discussed in copending commonly-assigned application Ser. Nos. 234,977, U.S. Pat. No. 5,005,124 and 285,891, U.S. Pat. No. 5,008,827, filed Aug. 23, 1988 and Dec. 16, 1988, respectively, the contents of which are hereby incorporated by reference. These applications relate to the concept of using certain limited user provided services but does not encompass the work sharing and data sharing services and concepts presented herein.

Commonly-assigned U.S. Pat. No. 4,713,761 describes a system for determining and accounting for the costs of shipping goods, which focuses mainly on a centralized accounting facility for multiple shippers and carriers.

Commonly-assigned U.S. application Ser. No. 285,486, filed Dec. 16, 1988 describes and claims another data sharing system via centralized database to improve user performance, the contents of which are incorporated herein by reference. Concurrently-filed, commonly-assigned U.S. application Ser. No. 416,735 describes and claims other aspects of systems for improving mail-processing efficiency.

Commonly-assigned U.S. Pat. Nos. 4,800,504; 4,800,505; and 4,800,506 describe computerized systems for preparing stationery items and their subsequent processing into mailpieces.

Commonly-assigned U.S. Pat. No. 4,837,701 describes a computerized system for processing and accounting for batch mail.

SUMMARY OF THE INVENTION

It is an object of the present invention to provide a system and method that enables a more efficient and effective use of the facilities of the Postal Service.

A further object of the invention is a system and method for optimizing delivery of bulk mail from mailers to a post office.

Another object of the invention is to reduce costs for entities involved in generating batch mailings.

Still another object of the invention is expedited delivery of mass mailings to their respective destinations.

The present invention extends the work-sharing concept by what can be termed the concept of co-mail, meaning, cooperation of the many entities involved in the creation of batch mailings in order to minimize costs or expedite mailings or reduce the Postal Service workload. This is accomplished by building on the data communications network described in several of the above-related applications to include on the existing network or as part of an independent network various entities involved in the creation or generation of mass or batch mailings.

In accordance with one aspect of the present invention, a data center is provided that is in a data communications network with a plurality of publishers and with a plurality of printers. The data center establishes a database containing information concerning the business operations of the publisher, termed "profiles", such as location, the kinds of ads generated and specifications therefor, for what kinds of customers, addressee demographics, etc. In addition, the data center establishes a database containing profile information concerning the printers, such as location, equipment available, job capacity, mailer capability, addressee files available, etc. The data center is in regular communication with both the publishers and printers via the network. This allows the data center to maintain up-to-date information not only on current jobs in execution but also on prospective jobs to be carried out and backlog of jobs waiting to be executed. As much of this information may be business proprietary, the data center, being independent of both the publishers and the printers, can by known security devices easily maintain such information confidential. Armed with these information databases, it is a relatively simple matter using conventional database processing to process the databases to match one or more printers to execute a particular job of one or more publishers. The matching criteria are: job completion time, job costs, mailing and distribution costs, and mail delivery times. An important criteria would be the mailing profiles of the ultimate addressees who will receive the ads.

In accordance with another aspect of the invention, the data center would also maintain a database of the job content of now executing or soon to be executing prospective jobs. By "content" is meant the size and weight of the printed ads, for what kind of addressees are the ads intended, envelope requirements. This would allow the data center to inform publishers or printers who are preparing job mailings that would have additional capacity in their mail pieces to add additional material at no additional postage or at minimum additional postage. The publisher could then send its mailings to that printer for inclusion in the envelopes. Or, it may be that a printer is executing a job for a first publisher for distribution to a particular mailing list. A second publisher who has ads intended for the same addressees on the mailing list would save expenses by adding its ads to the same envelopes, with the first publisher sharing in the savings. Not only do both publishers benefit, but so does the Postal Service, which now has only one mail piece instead of two to be delivered to each addressee.

Many other situations can arise where matching of publisher jobs to printer jobs can profit both sets of entities.

BRIEF DESCRIPTION OF THE DRAWINGS

The foregoing brief description and summary of the invention will become more apparent from the following more detailed description of the invention, accompanied by the attached drawings, wherein.

To best understand the system of the invention, it would be helpful to summarize the network description given in the referenced copending applications, because the same kind of network with only minor changes can be employed in the present invention.

SUMMARY OF PRIOR APPLICATION DISCLOSURES INCORPORATED HEREIN

Figure 1:
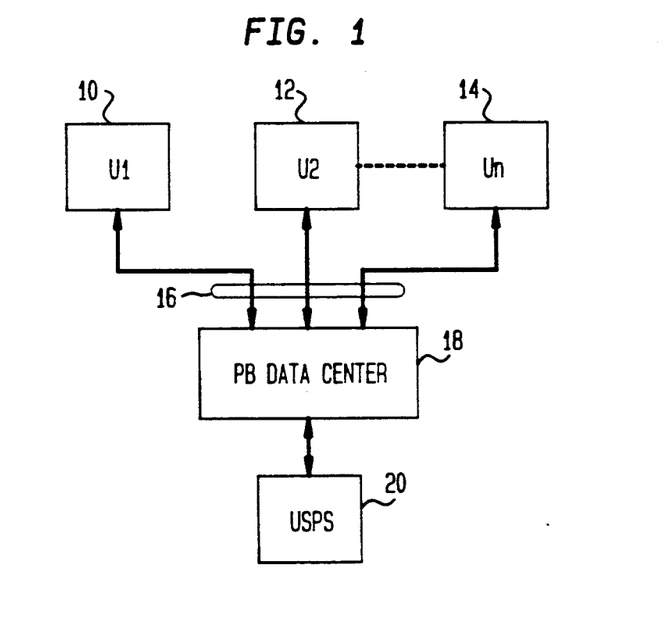
FIG. 1 is a functional block diagram illustrating the relationship between a data center, the U.S. Postal Service, and local users.

With reference to FIG. 1, a plurality of user stations designated as $U_1$, $U_2$... $U_n$, and identified as 10, 12 and 14 are shown. It will be understood that multiple user stations are possible in excess of the three shown, and that these are shown by way of example only. These stations are coupled by means of an interconnection data communication network, illustrated generally as 16, to the data center 18, which in turn may be appropriately coupled by means of a secure data line or the like to the U.S. Postal Service 20. The data center is a facility run by a commercial operation, such as Pitney Bowes, Inc., the assignee of the present invention. Each of the blocks 10, 12, 14, 18 and 20 contemplate the use of data processing components, each appropriately interlinked by means of high speed telecommunication links or the like for the purposes of exchanging information. It is also contemplated within the scope of the invention that the U.S. Postal Service can also maintain an appropriate computer facility, not specifically described herein, which will possess the capability of uploading and downloading specific pieces of information upon request by the data center, and relating to appropriate postal rules and regulations which will affect the use of certain discounts in mailing postal rates, as well as other factors necessary for the concept of shared work services which will be certified by each of the individual user stations in order to qualify for additional discounts when mail is received in the U.S. Postal Service facilities. The specific pieces of information will also be information relating to Postal Service planning and operations, as well as carriers that may be available for use and routing. The communication link is also contemplated as a two-way link between units 18 and 20, wherein the U.S. Postal Service can have, if desired, the capability of monitoring specific operations within the data center in order to ensure the data center is operational in accordance with rules and requirements which may be imposed by the Postal Service from time to time. The monitoring operation can be periodic unscheduled communication link examinations of certain storage areas of accessed memory locations for confirming proper operations. Of course, visual on-site inspections and examinations may also be made.

Figure 2:
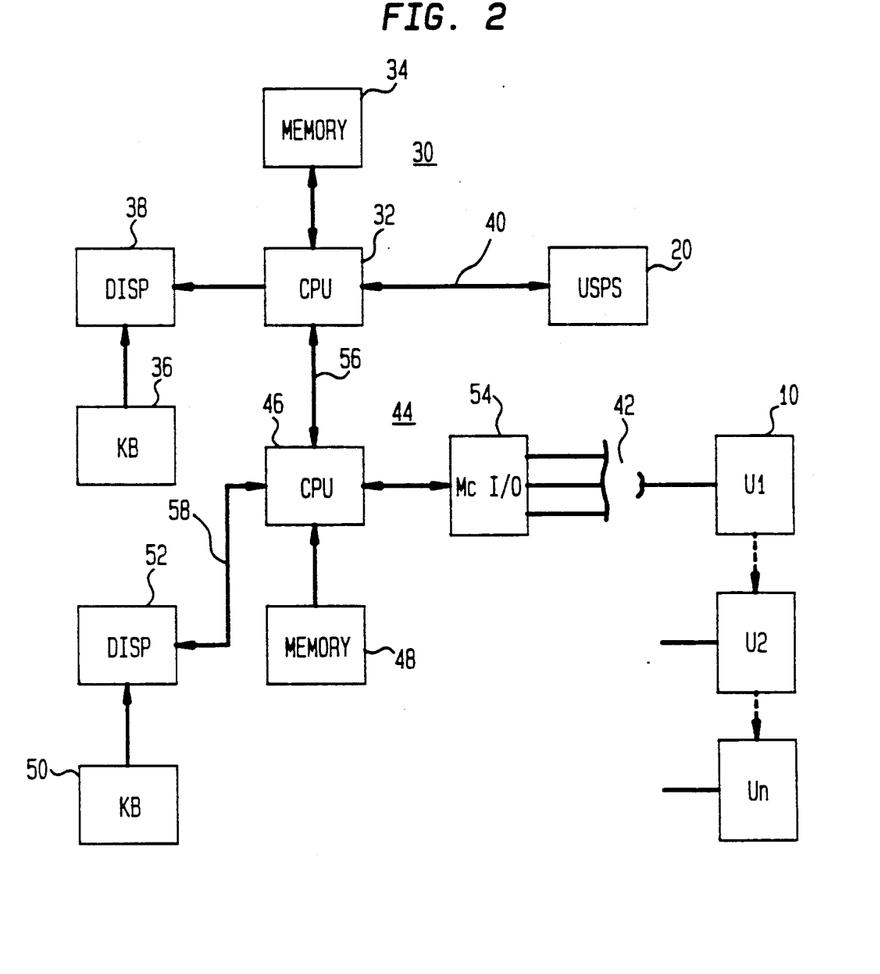
FIG. 2 is a more detailed block diagram illustrating the system of FIG. 1.

With reference to FIG. 2, a more detailed functional component relationship of the system of FIG. 1 is illustrated. Thus, the data center includes a first data channel 30 which includes a CPU 32 having a program memory 34, a keyboard 36 and an appropriate display 38 coupled thereto. Data communication link 40 interconnects CPU 32 to the U.S. Postal Service 20. The user units 10 are coupled via appropriate telecommunication data links 42 to a second data channel 44 which includes a CPU 46, a program memory 48, a keyboard 50 and an appropriate display 52. The CPU is coupled to the data links 42 by means of a multi-channel IO device 54 capable of high speed data communication. Elements 34 and 38 also include the usual data memory components of the computer configuration, including RAM memory and more permanent magnetic memory.

In operation, two-way communication between the data channel 30 and the U.S. Postal Service 20 provide a continuous interchange of information regarding updates of U.S. Postal Service rules and regulations covering rate reductions and as may be required for the continuous certification use by the local users 10. In addition, the data channel 30 may also be manually interogated by means of keyboard 36 for inquiring of the Postal Service for specific information which may be employed with regard to compliance with certifications, the answering of specific data questions, or other uses requiring specific interrogation by means of the central station to the U.S. Postal Service. Since the U.S. Postal Service link is a two-way communication over channel line 40, it is possible through this link for the U.S. Postal Service to interrogate and monitor the operation of the first data channel 30 and the second data channel 44, for compliance with quality control and other security compliances which may be required by the U.S. Postal Service.

Turning now to the second data channel 44, high speed continuous two-way communications with respect to continuous update of U.S. Postal Service requirements for certification, servicing and diagnostics, training, and other information interchange, as described in application Ser. No. 285,891, are effected by means of the CPU 46 operating through the high speed data channel 54 interfaced along with communication lines 42 to the multiple user network U1, U2 . . . Un. Operating under control of the program memory 48, the CPU 44 is contemplated as a high speed multiple processing information apparatus of conventional design such an IBM 3083 or a CD VAX unit which may handle multiple requests from any one or more of the users simultaneously through the multiple channel I/O device. Keyboard 50 and display 52 may be utilized for manual information interchange between any of the local users and the information operator. Although only a single keyboard display unit is illustrated, it will be understood that dataline 58 is a schematic representation of the existence of a multiple number of display keyboard combinations evidencing the use at the central station of a plurality of key operators available to answer user questions upon interrogation.

Figure 3:
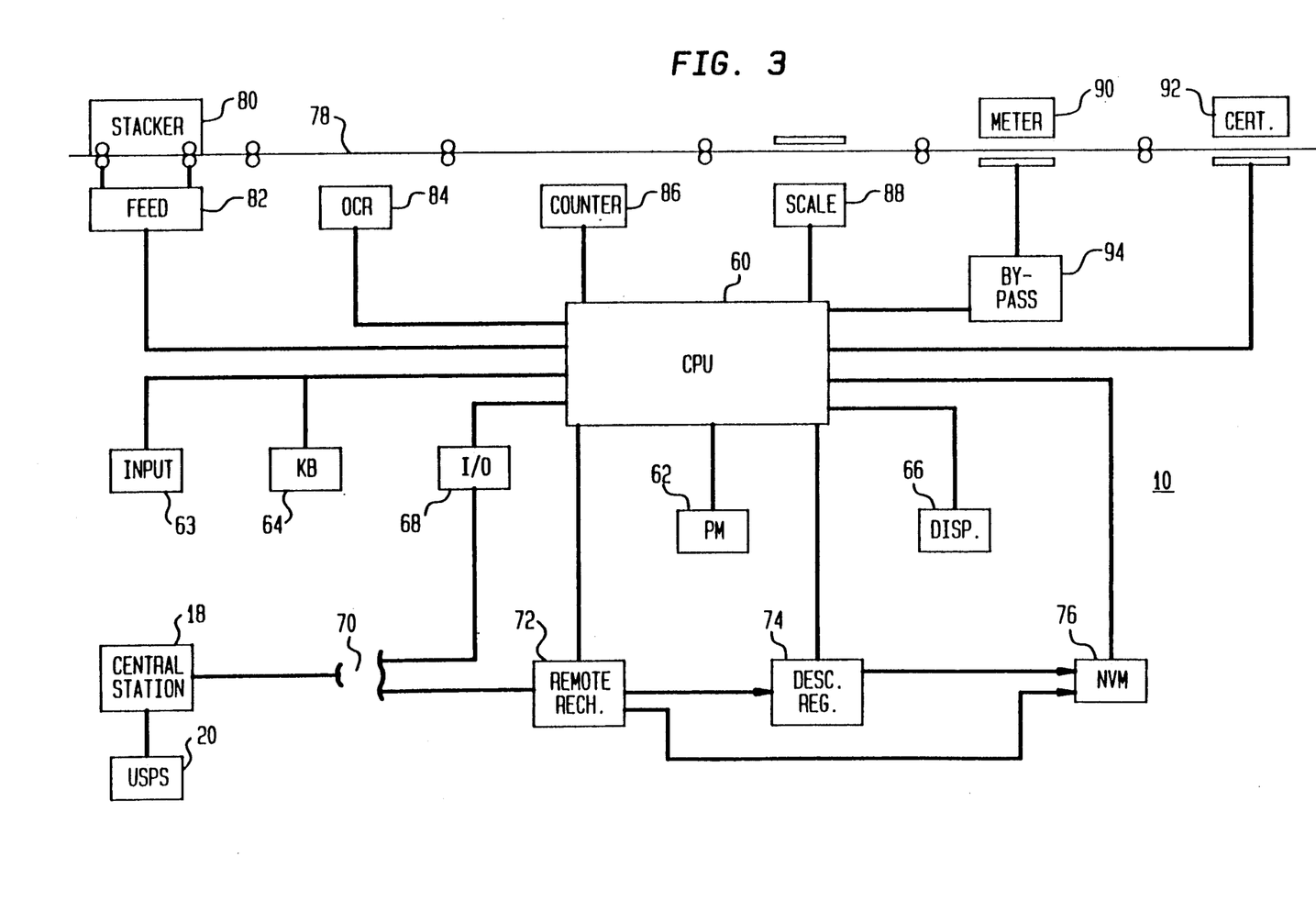
FIG. 3 is a more detailed block diagram illustrating a typical user or mailer station.

Referring to FIG. 3, a function block diagram illustrating the interrelationship of typical components within each individual user station is illustrated. The central user station operates under the control of a CPU 60, which includes a RAM memory and appropriate control registers. Coupled to the CPU 60 is a program memory 62 which defines the essential function of the system, including updating instructions and rates used in the local user units, diagnostic monitoring, a two-way communication link establishing a tracking facility utilizing, for example, the encryptic key represented by the certification, and interface capabilities with respect to the central station for the downloading of training information which enables operators at local stations to understand and comply with specific requirements imposed by the U.S. Postal Service with respect to the certification process. These capabilities are described in more detail in the related application Ser. Nos. 285,891 and 285,486. Coupled to the CPU 60 are a keyboard 64 for the manual entry of data requests and other information into the CPU, display unit 66 and an I/O channel 68 coupled by means of a data link 70 to the central station 18. Accounting information and funding to the local user 10 is effected through the data link 70 from the central station 18 to the remote recharger mechanism 72, operating in accordance with conventional recharging techniques, such as disclosed in U.S. Pat. No. 4,787,045, assigned to the assignee of the present application. Remote recharging unit 72 charges a descending register 74, in conventional manner, which keeps track of descending balances charged from time to time in accordance with mail requirements. Non-volatile memory unit 76 is employed to maintain security of information during periods of time when local user unit 10 is not operating. Non-volatile memory 76 receives descending register balances as part of a shutdown routine, along with other security data which may be applied from the active memory of the CPU 60. Remote recharging operations are carried on in remote recharging circuit 72 via the data link 70 to the central station 18, and operates independently of the OFF/ON status of the local user unit 10 for monitoring purposes. Thus, even if the local unit 10 is turned off, central station 18 through data link 70 may inquire through the remote recharging unit of the status of certain pieces of information which are maintained either in the RAM memory portion of the CPU 60 during on-times of the unit 10 or in the non-volatile memory 76 during inactive status periods. Another accounting system is described in commonly-assigned U.S. Pat. No. 4,796,193.

A concept of work sharings entail the performance of certain postal service functions by the user in a secure manner so as to enable the user to apply not only postage but to also apply certification, as an imprint on the mail piece, which will be accepted by the postal service that the services certified were in fact performed by the user and thus enable the user to be entitled to further mail rate reductions. Communication in contrast may also be by means of a code or other form with the relevant information transmitted in encrypted format. The information may be scanned and used to automatically set the postal equipment at the user site to proper settings, both for postage and for usage scheduling, without direct user intervention, thus enhancing security and efficiency.

Certification information is provided to the CPU through a plurality of inputs along a mail path designated as 78. Mail piece documents which are stacked in appropriate feeder-stacker unit 80 are, under control of CPU 60 through feeder-unit 82, driven along the mail path 78, past OCR unit 84 where printed material on the mail piece is read, past counter station 86 where individual pieces are counted, to the scale unit 88 where the mail piece is weighed, and thence to a metering station 90 for application of appropriate postage and finally to a certification station 92 where appropriate certification stamps may be placed on the mail piece to indicate compliance of the mail piece with all the criteria that have been set under work sharing requirements required under relevant U.S. Postal Service regulations. Since the unit may be capable of handling prefranked mail, a meter bypass network 94 operating under control of the CPU, provides for bypassing of the mail piece of the metering station 90 without the necessary application of additional postage. Problems encountered in short-weight mail may be adjusted by appropriate decrement of the descending register balance in descending register 74 under program control through CPU 60, based upon differences detected by the computer between applicable postage rate requirements and the actual mail run being passed through the user station 10. An example of short-weight mail is disclosed in copending application Ser. No. 285,146, U.S. Pat. No. 5,019,991 filed Dec. 16, 1988, and assigned to the assignee of the present application.

The data exchange between the central station and the user station give rise to further novel and unique processing capabilities in accordance with copending application Ser. No. 285,486. The user equipment can be periodically interrogated as to the customer usage patterns, mail runs, addressees, zip codes, rate breaks, etc. Based on this usage information, information can be down loaded from the central station 18 to the user. The down loaded information includes advisory procedures, such as the fact that postal charges for first class mail will increase shortly and that any mail run should be pushed out early, the fact that the user has the ability to avail itself of zip code breaks and other useful information as to mailing habits. In mail addressing, the data base incorporated by the central station also can benefit the user by expansion of the user equipment far beyond its limited nature by taking advantage of the relatively larger data base facilities available at the data center. One particularly advantageous use of the communication capability is the uploading of user mailing lists to a data center. At the data center, the information can be processed relative to the data center data base to sanitize the mailing address list. This includes noting improper zip codes, changes in carrier routes, changes in addresses when people move, etc. The information is thereafter down loaded to the user mailing equipment at the user location to allow the generation of sanitized effective mailing lists. This enables the user to have a higher "hit" rate of properly addressed and properly delivered mail. Moreover, the system provides advantages to the U.S.P.S. Billions of dollars are spent in redelivering mail which is improperly addressed. Mail can be improperly addressed for a number of reasons including the fact that an individual has moved and the new address data has not been properly entered into the system. By providing this service to, say, the top 500 mailers in the country, which constitutes in the area of 80% of the mail in the country (3rd class), a tremendous amount of expense would be saved by the Postal Service. Where the mailing lists are small, the businesses can upload their mailing lists to the data center. The uploaded mailing address are sanitized and processed, and in this instance, the center can provide the actual mailing service for the small business by providing the printing of the necessary inserts, inserting the material into the envelopes and addressing and distributing them. Alternatively, the center can download the address list to the mail business in the appropriate format. It can also be presorted by order with an indication as to the appropriate postage amount. The postage chargeable when the data center provides the mailing service can be directly charged to a user account. Additionally, demographic analysis can be done on the mailing list to identify additional customers who would fall into similar categories and are not yet being serviced by the small business. Moreover, by demographics analysis, other business opportunities for customers of the type serviced by the small business can be identified and provided to the user. The system would include sufficient security to ensure that the mailing list data for the customer is not improperly utilized. This has been described in more detail and claimed in copending application Ser. No. 285,145, filed Dec. 16, 1988, and concurrently filed application Ser. No. 416,735 which describes and claims extensions of these concepts. Additional details on the operations of this network, including detailed flow charts can be found in the referenced copending applications and need not be repeated here.

DETAILED DISCLOSURE OF PREFERRED EMBODIMENTS

OF PRESENT INVENTION

For the network described above to be operable for carrying out the present invention, additional entities have to be added. These entities would have on their premises the same kinds of computer equipments described for the users 10–14 in the earlier network, and other equipment, all of which is conventional and commercially available, for carrying out the functions of that particular entity. Thus, a publisher entity would have the usual resources currently possessed by publishers, including personnel and equipment for creating ad copy and job specifications for that copy. Publishers would also have available a means for recording and storing in their computer the physical parameters and specifications of each ad copy. Moreover, if the publisher also were a mailer, it would have as resources the same mail processing equipment above described for the user stations. In addition, the publisher could have the capability to create E-Mail versions of its ad copy, which can then be transmitted over the network or via telephone lines to other entities on the network.

Printer entities would have as resources the usual equipment to covert ad copy into hard copies of the ads, in the final form to be distributed to addressees. Printers sometimes have mail processing capabilities also. That is, not only do they print the hard copies of the ads, they also have the equipment to stuff them into envelopes, seal and stamp them. Printers sometimes have addressing capability. That is, they have addressee files and can use those address files to address envelopes for the publisher and then to package those envelopes for delivery to the Postal Service.

The printers could also have inserter equipment which provides a series of stations holding multiple copies of a particular insert, and whereby collations are advanced through the machine past each of the stations which are programmed to add inserts to particular collations. At the end of the machine, the collations are stuffed into envelopes which are then sealed and subsequently processed for franking or other postage accounting. An example of one such machine is described in commonly-assigned U.S. Pat. No. 5,003,485, filed Dec. 30, 1988. Commonly-assigned U.S. Pat. No. 4,817,042 also describes a computerized inserter machine for optimizing the final weight of a mailpiece.

In the system of the invention, the data center maintains a database of publishers and their profiles, and databases of printers and their profiles. Moreover, each of these user entities on the network are continuously uploading to the data center information concerning their current activities and planned future activities. The data center processes this information seeking profitable matches between the various entities. Examples of suitable matches will be given below, but, first, reference is made to FIG. 4 which provides a diagram illustrating the relationships among the various entities of the system.

Figure 4:
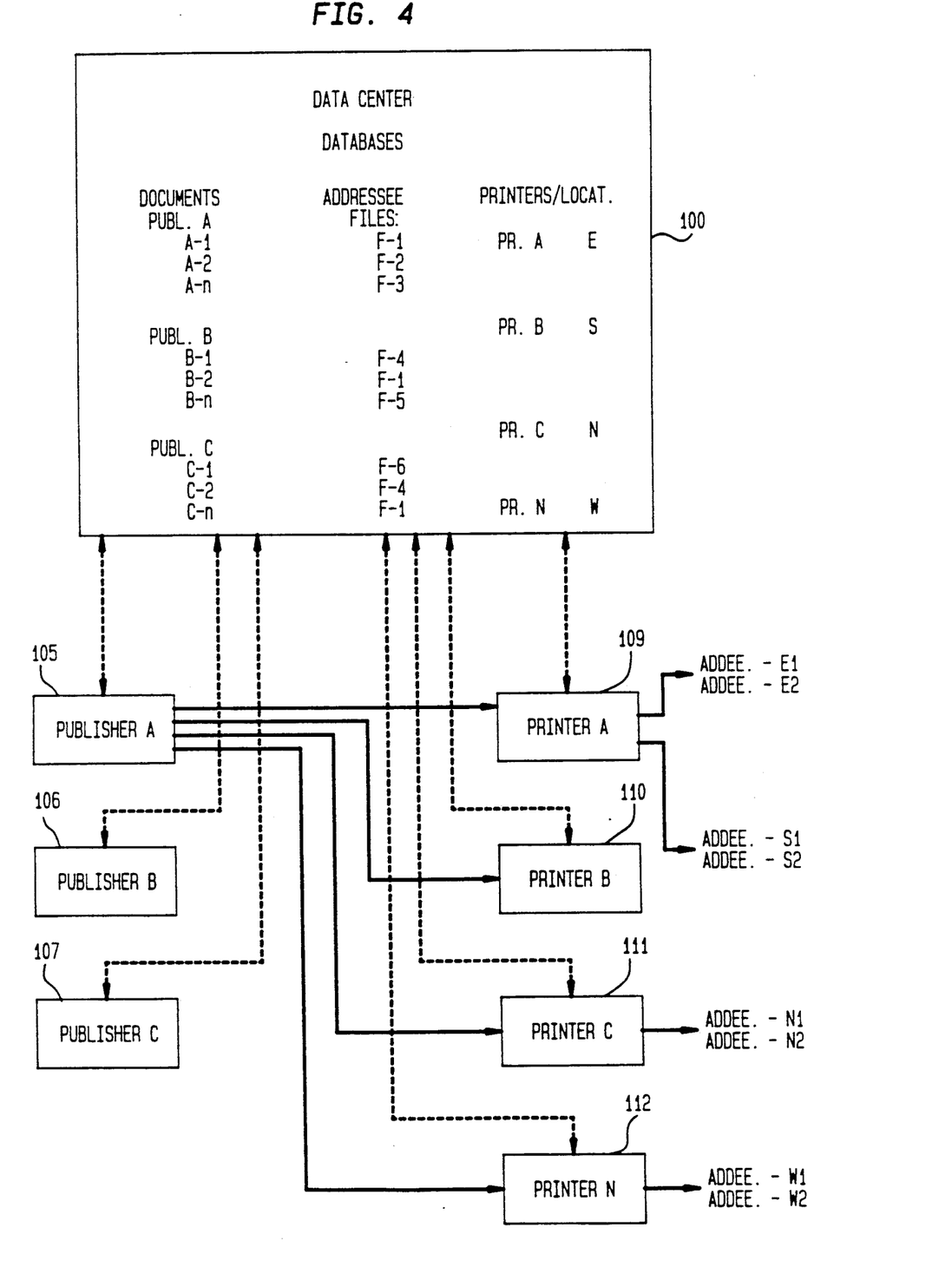
FIG. 4 is a block diagram of a system according to the present invention.

In FIG. 4, the data center is represented by block 100. It maintains databases of publishers on the network, represented by blocks 105, 106 and 107, and databases of printers on the network, represent by blocks 109, 110, 111 and 112. Each of the latter is in continuous communication with the data center via the network, represented by the double-arrow-ended dashed lines. As a result of these communications, the database has stored the following information, as an example only. Publisher A has ads A-1, A-2 and A-3 to be distributed, respectively, to addressees in files F-1, F-2 and F-3. Publishers B and C also have ads as similarly labelled in block 100 to be sent to the addressee files indicated. Note that all three publishers, operating independently, have created ads intended for addressees with the profiles of the F-1 file. The printers, in this example, have been located in four different geographic regions, indicated by E, S, N and W. Their capabilities to print the ads of the publishers, whose specifications are maintained at the data center, is readily determined by the data center. Due to continuous on-line communications, the data center, in choosing a printer for a particular job, can take into account not only equipment and other resources available to each printer, but also current workloads and the ability to generate the necessary hard copies within the time frame desired by the publisher.

Another important factor easily included in the data processing is the locations of the addressees relative to the location of the printers. For instance, suppose that addressee file F-1 is composed of addressees located in an eastern region. Distribution of the ads to addressees would be expedited by choosing printer A, likewise located in the eastern region if printer A had the resources to print the ad and the resources to make up the mailings to those addressees and deliver to the local Post Office. So, already valuable benefits accrue to Publisher A as a result of the operations of the data center, as an independent entity, in maintaining these databases of publisher and printer activities.

But, other possibly more valuable benefits can be obtained from the system of the invention. For example, the data center has detected that Publishers B and C also have ads intended for the same addressees in addressee files F-1. Accordingly, Publishers B and C are notified to forward their copy to Printer A to include in the same envelopes that will contain Publisher A's copy. All members of the system gain from this example of co-mail. Postage costs are minimized, as it may not cost too much more to add Publisher B's and C's documents to the common envelope. Moreover, distribution to the addressees due to local printing and use of local Post Offices is expedited. The Postal Service benefits, as it now has only to deliver one letter instead of three.

There are many other ways in which the co-mail principle can be applied to benefit the network entities. Suppose that Printer C has received an order from Publisher B to print and mail documents B-1 to addressees listed in file F-4. The data center is informed. The data center, storing profiles of the publisher's activities, knows that Publisher C also frequently creates copy for addressee file F-4. The data center can then advise Publisher C that Printer C is printing documents for distribution to addressees in file F-4, that the weight of the documents from Publisher B is only one-half of the weight allowed for the postage to be supplied, and thus envelope capacity is available if copy for the same addressees exist and is forwarded to Printer C in time. They then can be added to the existing envelopes for no additional postage. Thus, the postage costs for Publishers B and C are halved in this example of co-mail.

There are many other ways in which a data center, linked in a network with and possessing information concerning activities of mail publishers and mail printers can benefit the entities involved. Another important way is by providing value-adding-information to users with limited resources of their own. For instance, a data center subsidized by many users can compile and process much valuable information for entities on the network. Thus, there are organizations that create demographics information on individuals and families throughout the country. The cost of acquiring such information and customizing it for particular publishers or its customers can be prohibitive for one entity, but affordable when performed by the data center for many entities. The data center can use this demographics information to update addressee files of publishers, to add or delete addressees, or to form smaller sets of addressees for more focussed merchandising.

FIG. 4 also depicts that the data center can match Publisher A for the ads it plans to distribute throughout the four regions with printers local to each of those regions, thereby reducing distribution costs. Moreover, with the popularity of E-Mail, documents to be printed can be transmitted as E-Mail via the network to the data center and then by the data center to the selected printer for those ads. What is not shown in FIG. 4, but will be evident, is that the same data center processing can match Publishers B and C with any of the printers on the network based on the same selection criteria used in matching Publisher A with the various printers. In general, the principal criteria would be (a) printer geographic location relative to addressee geographic locations, (b) the existence of excess envelope capacity so that additional ads could be incorporated at no additional postage charge, and (c) addressee files possessed by the printers, representing sets of addressees defined by demographic data and representing desirable targets of particular publisher's ads.

As earlier mentioned, the existence of the data center as an independent third party offers many benefits to the network users. Proprietary information can be maintained securely at the data center, and well-known security techniques, such as encryption, employed to ensure that proprietary information of a publisher or printer is not passed on to a competitor. Similarly, addressee files, which are often proprietary, can be stored in the data center without risk of unauthorized access by entities on the network. In the latter connection, a service that the data center can provide is to acquire and store demographics information, such as personal or family income, housing value, educational level, and other items frequently used by publishers or their customers to determine who should get which ads. the demographics information can be used to refine and update or upgrade addressee files uploaded by the publishers or printers and after such refining returned to the original source or retained by the data center as useful information in its matching routines.

Another important service that can be performed by the data center is an accounting function, as indicated in the copending applications. In this instance, accounting could consist of payments to the selected printers for the jobs executed, and allocation of the printing and mailing costs among the comailing publishers, whose account at the data center would then be appropriately debited. Commoly-assigned U.S. Pat. No. 4,837,701 also describes an accounting system employing a central station, whose principles and configuration can also be used herein for payment accounting.

Figure 5A:
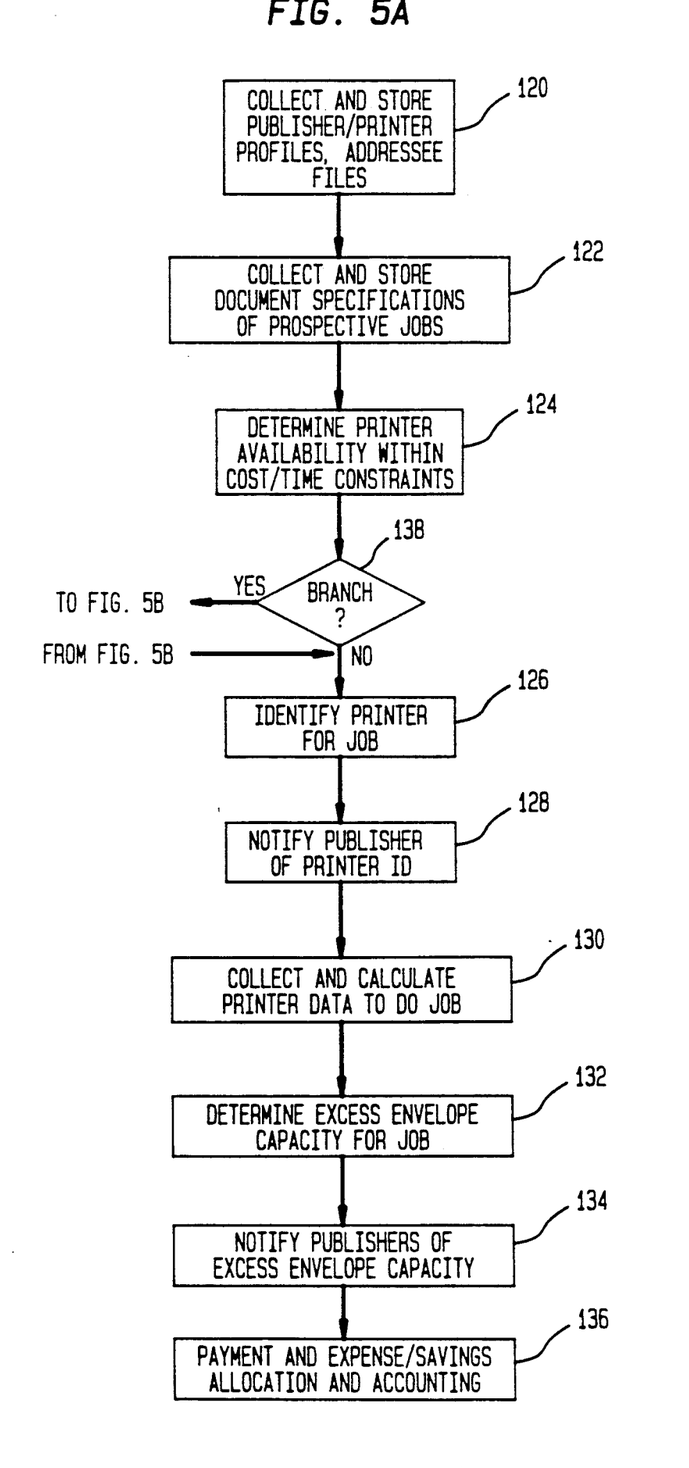
FIGS. 5A and 5B are flow charts depicting several typical processing operations of a system according to the invention.

FIG. 5A exemplifies the processing sequence for a typical situation. In block 120, the data center uploads from each of the entities on the network the necessary information to establish profiles of the business activities of the publishers and printers, which profiles would assist matching publisher jobs to printer capabilities. In addition, the data center would store addressee files available to printers or mailers or used by publishers for their ads.

In block 122, the publishers upload to the data center document specifications of current and prospective jobs, which would include the type of ad, print equipment required, size and color and weight, and for which set of addressees intended.

The data center computer would then process the information it has stored, using known database processing techniques, to determine which printers would quality to execute a particular job, taking into account any time and cost constraints imposed by the publiser. If more than one printer qualifies, then the selection would be based on geographic location of the printer relative to the addressee set involved, and/or excess envelope capacity available at a particular printer thus greatly reducing postage expenses, and/or desirable addressee files owned by a particular printer. The ultimate choice, indicated at block 126, can be based on a prioritizing by the publisher of the above criteria for each job, included in the job specification supplied to the data center.

At block 128, the publisher is notified by the data center of the selected printer or printers for the job, and if necessary the data center can become involved in transmitting the job to the selected printer.

The data center now calculates at block 130, knowing the printer's resources, whether the printer will have excess envelope capacity when the completed printings are inserted in mail envelopes, shown at block 132. If so, the data center will scan through its listing of jobs and prospective jobs to determine whether any would qualify for incorporation in those envelopes. In other words, are there any other mailings available destined for the same set or for a subset of the addressees. If so, the publishers of those jobs are immediately notified, in block 134, that a job is being executed destined for a set of addressees to whom the publisher also intends to send documents; hence considerable savings in time and money are available by taking advantage of unfilled envelopes destined for those addressees.

Finally, in block 136, the data center, if desired, can arrange for payment to the printers upon completion of the jobs, and debiting the account of the involved publisher, if alone, or allocating the cost thereof among the cooperating publishers in accordance with any formula agreed to by the publishers.

Figure 5B:
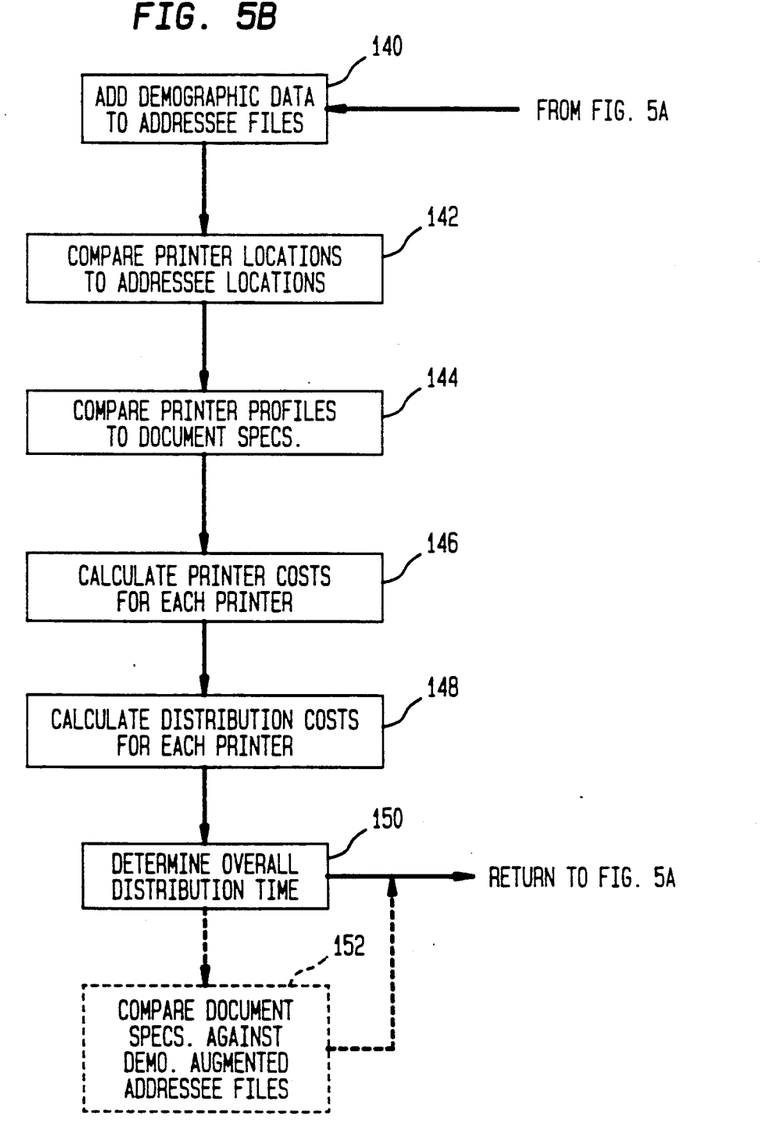

FIG. 5B depicts another typical processing sequence for the system of the invention, for the purpose of showing benefits available in a different situation. The steps depicted in blocks 120, 122 and 124 in FIG. 5A can be followed. A branch is taken at block 138 to the flow sequence depicted in FIG. 5B. In block 140, if desired, demographics data can be added to the addressee files. In the next block, 142, qualified printers are identified by comparing their locations to that of the addressees targeted for the particular ads. In block 144, printer profiles are compared against the document specification to ensure the availability of resources to print the volume of documents required by the job. In block 146, the printings costs are then calculated for each qualified printer based upon data stored in each printer's profiles. In block 148, the distribution costs are then calculated for each printer based upon location relative to the addressees. In block 150, the overall distribution time is estimated. The sequence can then return to FIG. 5A. A printer is identified at block 126. This identification can be based on a prioritizing, using conventional programming techniques, of the publisher's needs, for example, printer location first, costs second, time last. In other words, in sequence, optimum location would be sought by a location comparison. If this is satisfied by one printer, that is the one selected. If more than one qualify, a second comparison test is performed to determine optimum costs, and so on, until a printer optimum for the job is determined. If desired, indicated by the dashed sequence referenced 152 in FIG. 5B, the document specification can be compared against the addressee files augmented with the demographic data to avoid the distribution of ads to addressees not likely to be interested in the ad offerings. The remaining sequencing is shown in FIG. 5A. As noted, for databases of reasonable size, by relatively simple, straightforward programming, the matching of publisher to printer can be readily optimized in accordance with the needs and resources of the entities involved to the benefit of all members on the network. The public benefits because reduced distribution costs will be reflected in reduced merchandise prices and because, for the same and in most instances improved targeting of prospective purchasers and reduced mailings, the involved Postal Service operations are also reduced.

The system and methods described herein can be used alone, or in combination with many of the systems described in the referenced copending applications. For example, the concurrently-filed application Ser. No. 416,735, describes a similar network in which the entities matched are publishers and inserters. That system is readily adapted to be consolidated with the present system by adding inserters to the network as there described. Also, as another example, the referenced copending applications Ser. Nos. 285,145 and 285,486 relate, respectively, to networks which allow updating of customer lists by a data center, and to networks in which a data center creates databases of mailer activities for selective accessing by mailers to improve their operations. Those systems are readily integrated with the system of the present invention, since the same equipment can be used, the major difference being the information stored at the data center and the data processing criteria. The same applies to the certification system described in application Ser. No. 285,891, U.S. Pat. No. 5,008,827.

It will be evident to those skilled in the art that, from the network descriptions given herein and in the reference applications, it is a relatively straightforward development to construct such a network and establish the data communications links that will allow the data center to perform the functions described herein. Also, those skilled in the art will recognize that creation of the databases described, and programming of the data center computer to process the stored information to make the desired matching of publisher to printer, for databases of a reasonable size, is also a straightforward project development using programming and development tools available from many vendors. Any known, suitable, matching or selection algorithm can be employed, in addition to the preferred ones described above. The processing time is not critical, and thus, while desirable, it is not critical to the invention that the databases are built and processed rapidly or that access time to the network is short.

While the invention has been described and illustrated in connection with preferred embodiments, many variations and modifications as will be evident to those skilled in this art may be made therein without departing from the spirit of the invention, and the invention as set forth in the appended claims is thus not to be limited to the precise details of construction set forth above as such variations and modifications are intended to be included within the scope of the appended claims.

What is claimed is:

1. Apparatus for performing mail processing functions for postal system users, said apparatus comprising:
   (a) a data center having a data processor and means for receiving and storing data representative of:
      (i) specifications of inserts to be produced and distributed via the postal system to a plurality of addressees;
      (ii) profiles of a plurality of facilities for producing inserts from said specifications;
   (b) means for processing said data to determine which facilities are suited for producing determined inserts.

2. The apparatus of claim 1, wherein said stored data includes volume use data and addressee data.

3. A system for performing mail processing functions, comprising:
   (a) a data center having a data processor and storage means,
   (b) a plurality of users performing publishing functions and generating specifications for inserts to be produced for distribution via the postal system to a plurality of addressees,
   (c) a plurality of users performing producing functions and generating the inserts from said specification,
   (d) a data communications network interconnecting the data center, the publishing users, and the producing users whereby the publishing users can transmit to the data center data representing specifications of the inserts to be produced and the producing users can transmit to the data center data representing profiles of their activities, said data center data processor storing said data transmissions in said storage means,
   (e) said data center processing said specifications and profiles data for determining a producing user for producing the inserts of the publishing users to reduce production and distribution costs or to expedite distribution to the addressees.

4. The system of claim 3, wherein said stored data includes demographics data of the addressees.

5. The system of claim 4, wherein the stored profiles of the producing users comprises their location, current producing jobs including envelope capacity, and addressee files.

6. The system of claim 4, wherein the producing users are located in different geographic locations, and the addressees are located in different geographic locations.

7. The system of claim 3, further comprising means for communicating information to a publishing user concerning a particular producing user to use for a particular insert.

8. In a mailing processing method, the steps comprising:
   (a) interconnecting via a network, a plurality of publishers of advertising documents for mail distribution to a plurality of addressees in different geographic locations, a plurality of document printers, and a data center having data processing facilities,
   (b) compiling a database of documents to be distributed by said publishers and a database of printers' profiles,
   (c) determining costs of printing the documents at various printers and assembling individual mail pieces for mailing to the addressees, and
   (d) transmitting to the publishers identification of printers for local printing of particular documents to reduce the costs involved in printing and distribution to the addressees.

9. In the method of claim 8, wherein step (c) is carried out by comparing locations of the printers and locations of the addressees to receive particular documents.

10. In the method of claim 8, wherein step (c) is carried out by comparing the printer's resources and specifications of the documents to be printed.

11. In the method of claim 8, wherein step (c) is carried out by comparing available envelope capacity at the printers and specifications of the documents.

12. In the method of claim 8, wherein step (c) is carried out by comparing specifications of the documents and addressee files available to the printers.

13. In a mail processing method, the steps comprising:
   (a) interconnecting via a network, a plurality of publishers of advertising documents for mail distribution to a plurality of addresses in different geographic locations, a plurality of document printers having different geographic locations, and a data center having data processing facilities,
   (b) compiling a database of documents to be distributed by said publishers and a database of addressee profiles and a database of printer's profiles,
   (c) determining which documents are to be distributed to which addressees,
   (d) determining costs of printing the documents at various printers and assembling into individual mail pieces for mailing to the addressees,
   (e) transmitting to the publishers identification of printers for local printing of documents and identification of addressees to whom those documents are to be mailed to reduce the costs involved.

14. In a mail processing method, the steps comprising:
(a) interconnecting a plurality of publishers of advertising documents for mail distribution to a plurality of addresses in different geographic locations, and a data center having data processing facilities,
(b) compiling a database of documents to be distributed by said publishers and a database of addressee profiles,
(c) determining which documents are to be distributed to which addressees and whether the mailpiece containing the documents can accommodate additional documents for the addressee, and
(d) transmitting to the mailers identification of mailings and addressees to whom documents are to be mailed and data indicating whether those mailings can accommodate additional documents to enable the mailers to add additional documents to the mailings.

15. In a mail processing method, the steps comprising:
(a) interconnecting a plurality of independent mailers of advertising documents for mail distribution to a plurality of addressees, a plurality of independent publishers of advertising documents, and a data center having data processing facilities,
(b) compiling a database of addressees and addressee profiles and a database of documents to be distributed,
(c) determining which documents from the plural publishers are relevant to which addressees, and
(d) transmitting to the mailers and to the publishers information enabling the mailers to receive from the publishers those documents which can be combined into a single mailing to a particular addressee.

* * * * *